Dec. 3, 1935.  J. PAVLECKA  2,022,900
SUPERCHARGING OF POWER PLANTS
Filed Jan. 6, 1933  2 Sheets—Sheet 1

INVENTOR:
John Pavlecka

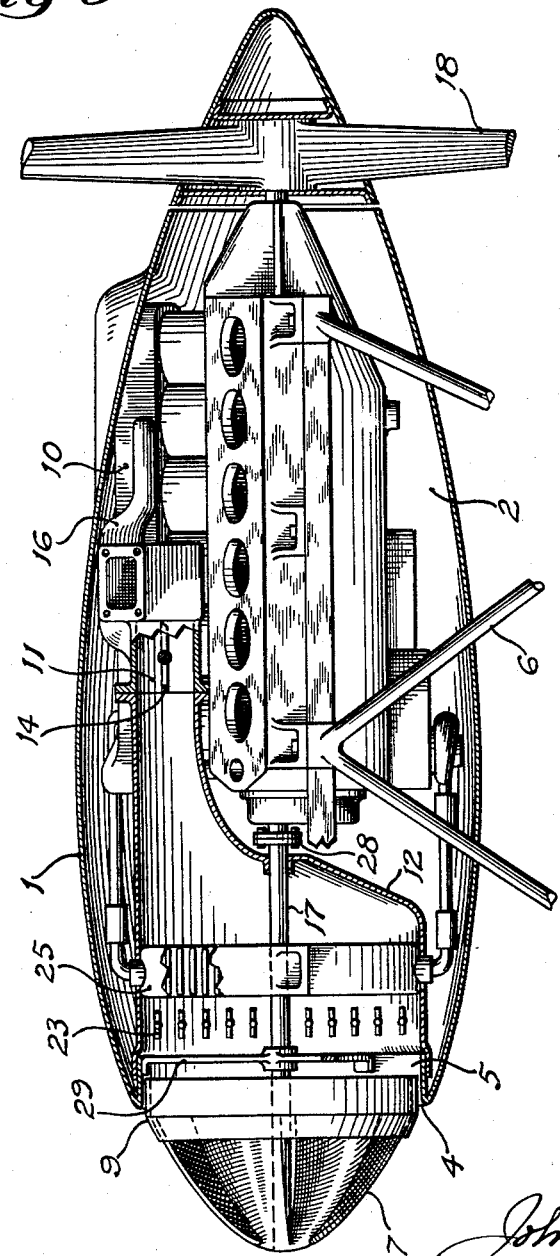

Patented Dec. 3, 1935

2,022,900

UNITED STATES PATENT OFFICE 2,022,900

SUPERCHARGING OF POWER PLANT

John Pavlecka, Detroit, Mich.

Application January 6, 1933, Serial No. 650,441

35 Claims. (Cl. 244—31)

My present invention relates more particularly to a novel apparatus for supercharging aircraft and other thermal power plants.

The output of any thermal power plant being proportional to the amount of air available for combustion therein, supercharging has been resorted to in aircraft and other power plants in order to obtain a higher output-to-weight ratio. However, because of mechanical complications, excessive weight and high cost, supercharging apparatus thus far developed has not been adopted for general use and natural induction of air still predominates.

Realizing the advantages of supercharging, in aircraft in particular, I have conceived a new apparatus which makes it possible to deliver air into a power plant in increased volume or at higher pressure than normally without any of the drawbacks of the present superchargers.

The principal object of my invention is a system for supercharging internal combustion engines in aircraft and other vehicles in a simple and effective manner.

A further object of my invention is to provide forced draft for elastic fluid power plants in aircraft, locomotives and other vehicles for intensifying the heat exchange therein.

Another object is to provide a highly efficient thermal system of power generation including accelerating and compressing of the air for combustion, preheating this air and cooling the power plant.

A still further object is to devise means for accurately controlling supercharged power plants, including their combustion, output and cooling.

The apparatus through which all of the above objects are materialized will now be disclosed in principle and function, and then described as illustrated by three embodiments in the drawings forming an integral part of this specification.

The present invention has been conceived as making use as one of its essential component elements, of a rotary blower or impeller of air of compact size and large capacity, preferably one of conoidal form such as has, for instance, been disclosed in my Letters Patent No. 1,779,186, which specification deals with cooling of power plants by means of an impeller of the contemplated type.

Similarly as in the foregoing specification for cooling power plants by an internal air stream, the aircraft or any other means of locomotion employing my new supercharging system comprises a power plant compartment in a body tapering toward the forward extremity and terminating with a circular opening thereat. The power plant, for purposes of this invention, is characterized in that it has a driven shaft projecting axially through said opening in the body housing it, and furthermore, in that it has an intake port for the air that is used for combustion in the power plant. On the shaft of the power plant, adjacent to said opening in the body housing it, is mounted a rotary blower or impeller of air which can be of any type but which is preferably distinguished in that its external profile contour forms the apex of the tapering body, and which has an open base registering with said opening in the body for discharging, in rotation, air thereinto. In the interior of the body housing the power plant is an air duct which conjoins to said body at said opening therein at one end, and to said intake port of the power plant at the other end, and has for its function to convey the air stream blown in by the impeller to and into said power plant.

This principle and function of my invention will now be presented in three typical embodiments as illustrated in the drawings, wherein Fig. 1 represents a longitudinal cross-section through a power plant compartment showing all the essential elements of the supercharging system of my invention in characteristic coordination; the power plant is an internal combustion engine.

Fig. 3 is a cross-section through a "nacelle" often used on airships and airplanes; the power plant in the nacelle is an internal combustion engine driving a "pusher" propeller; the near bank of cylinders of the V-type engine is removed.

Like numerals in all three views indicate corresponding elements in the various embodiments.

Figure 1:
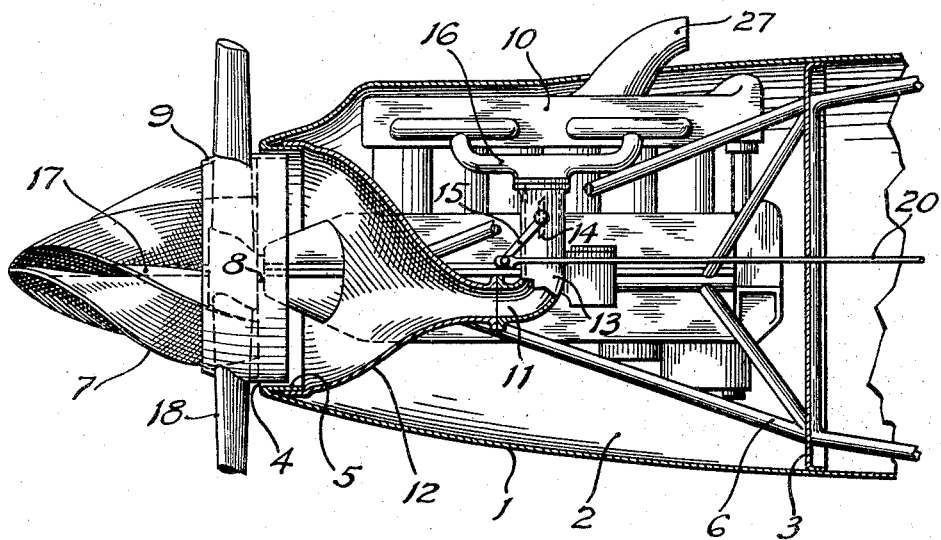
Figure 2:
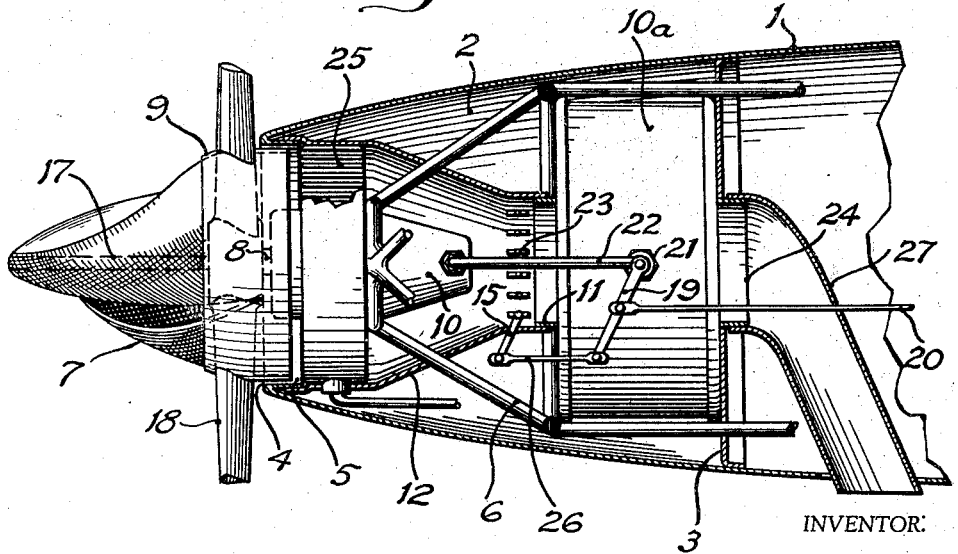
Fig. 2 is a similar cross-section, the power plant in this case being an elastic fluid one comprising a fluid generator into the combustion chamber of which air is to be supplied in large quantities and at high velocity.

Referring conjointly to all three embodiments as represented in Figs. 1, 2 and 3, the body 1 of an aircraft or other vehicle tapers forwardly towards the circular opening 4 and terminates thereat; the body 1 includes the power plant compartment 2 separated from the rest of the body by the bulkhead 3. The power plant 10 has the positively driven shaft 8, and is supported on the bearer 6 in such a manner that the shaft 8 projects axially through the opening 4; the shaft 9 in most cases represents the propeller shaft of the power plant, the propeller 18 being mounted thereon directly at the opening 4, as shown in Figs. 1 and 2. The power plant 10 is, furthermore, characterized in that it has the central intake port 11 for air; this port leads into a distributing manifold or directly into the combustion chamber of the power plant. At the opening 4, on the extension 17 of the shaft 8 is secured the air blower or impeller 7, the central portion of the propeller 18—in case there is one—being included within its length and diameter.

Although any type of air blower, fan or impeller would undoubtedly function to a more or less beneficial degree in the supercharging system of my invention, preference and novelty are claimed for the aforementioned type whose vanes are formed within a profile contour forming a complement of the tapering body 1 to an apex. There are several ways in which the vanes of the impeller 7 may be convoluted within a spheroidal, paraboloidal, or conoidal profile contour, two distinct examples being shown in the three embodiments presented.

The impeller of Fig. 1 comprises a number of vanes disposed substantially radially on the central shaft 17 and helically convoluted around it between an apex and an axially open base within the shrouding band 9. The impellers of Figs. 2 and 3 are both characterized by the same basic configuration, and represent the preferred type of air blower for the purposes of this invention. This latter type is fashioned, generally, as the usual spinner for streamlining aircraft propellers, being a hollow shell of any of the above mentioned geometrical, or any other profile tapering from a base to an apex; in its peripheral surface, the spinner shell is provided with a number of slits or scoops which face the angular direction of its rotation and longitudinally extend fully or partly between its apex and its axially open base within the shrouding band 9. The peripheral segments of the spinner shell between its successive scoops constitute as many vanes each of which has one leading and one trailing edge, and as the leading edge of each vane borders along the profile contour of the shell while its trailing edge follows, angularly distanced therefrom, on a smaller radius, each vane thus assumes an angle of incidence with respect to its angular direction of travel, and preferably is given a convex curvature between its edges. As shown in Fig. 2, the edges of the vanes may be spirally wound around the shaft 17, or, as shown in Fig. 3, they may be substantially straight in the axial direction, thus delineating either spiral or rectilinear scoops, respectively. Now in rotation, or in combined rotation and forward motion, the air encountered by the scoops will be attacked by the oblique vanes and will slide therealong centripetally and axially toward the shrouding band 9 and outwardly through it as a continuous blast.

The significance of the impeller of the above specified form resides in its ability, due to its conoidal form and longitudinal scoops, to get hold of the air within its range and force it inwardly at a greater rate and with less loss than either any other blower or plain scooping of the slipstream could accomplish; in consequence, the impeller, being rotated at a speed roughly in proportion to the output of the power plant, will supply it with such an amount of air as to make it deliver an output higher than it would deliver at normal atmospheric pressure; moreover, the air resistance of the body housing the power plant will not be increased, on the contrary, it may be considerably reduced, and the exterior appearance of that body will not be impaired in any way.

The shrouding band 9 at and around the base of the impeller follows for a short distance the tapering outline thereof, and projects beyond that base into the compartment 2 through the opening 4 with a substantially cylindrical portion. The body 1 is provided at the opening 4 with a cylindrical ring 5 which extends from that opening inwardly for a short distance and embraces the impeller shrouding band 9 with a small running clearance. The shrouding band 9 and the ring 5 have for their purpose to seal the clearance between the impeller 7 and the body 1 against loss of air. In rotation and forward progression, the air striking the forwardly tapering portion of the band 9 will slip along it into the clearance between that band and the ring 5, and will be trapped therebetween whereby dynamic pressure will be established at that point, which pressure will have an inward gradient and will oppose the escape of air from the inside out.

Between the opening 4 in the body 1, or more specifically, between the cylindrical ring 5 in that opening and the intake port 11 of the power plant 10, there extends the air duct 12 which provides a passageway for the stream of air delivered by the impeller 7, and conveys that stream to and into the intake port 11 in such a manner as to either preserve its velocity or build up its pressure, depending upon the requirements of any particular power plant.

Referring now specifically to Fig. 1, the power plant 10 in this case is an internal combustion engine, and the intake port 11 is the entrance into the carburetor 13; from this carburetor a mixture of air and fuel is distributed into a number of cylinders through the manifold 16.

The effect most desired in an internal combustion engine is that the air entering into it, in addition to possessing a certain velocity for proper atomization of fuel, will also possess an initial compression of as high a degree as practical in order to fill the cylinders to their full normal volume or above it in the fraction of time reserved for that purpose, and thus raise the output of the engine. This condition is achieved in my supercharging system by converting the velocity of the air stream rushing in from the impeller 7 partially into pressure in the duct 12. To this end the duct 12 is made to taper in cross-sectional area from its open end at the ring 5 to its terminal end at the intake port 11 so that the air forced into it at high velocity will be gradually checked and its kinetic energy diffused as the area of passage decreases, whereby there will be a constant increase of pressure of the air towards the intake port 11.

For controlling the output of the engine 10, the customary throttle 14 is employed, this throttle being located in the carburetor 13, adjusted by means of the lever 15 and remotely operated by the push-and-pull rod 20; the throttle is shown wide open.

Referring now exclusively to Fig. 2, the power plant in this case comprises the fluid generator 10a and the prime mover 10. The prime mover 10 may be of any type, i. e., either a reciprocating engine or a turbine; it is carried on the bearer 6 close to the opening 4 so that its driven shaft 8 will project through that opening; as in the preceding case, there is the impeller 7 mounted on the extension 17 of the shaft 8.

The combustion takes place in the generator 10a of the elastic fluid, the generator being supported on the rigid skeleton of the body 1 behind the prime mover 10. The generator 10a may be of any type, its main characteristic for purposes of this invention being the intake port 11 for air, which is shown as being approximately in the center of the generator, although it may be offset to any other point. In the rear of the generator 10a is the discharge port 24 to which the flue 27 is conjoined for carrying the products of combustion out of the body 1.

The air duct 12 for feeding the generator 10a connects to the ring 5 at its open forward end, and thence proceeds inwardly past the prime mover 10 and beyond it, gradually contracting in diameter as approaching the intake port 11 and finally making a juncture therewith.

The combustion that takes place in the generator 10a is, in contrast to that in the engine in Fig. 1, a constant volume process and air under pressure is, therefore, no longer essential, high velocity of the air being needed in order that the heat exchange through the walls of the generator be as rapid as possible. For this reason the duct 12 is proportioned so as to conserve the velocity of the air passing through it, its cross-sectional area being approximately constant throughout its whole extent.

The prime mover 10 is positioned centrally in the duct 12, and the expanded fluid from it is exhausted into the condenser 25 which is likewise disposed in the duct 12. The positioning of the condenser 25 in the air duct 12 is an outstanding feature of my invention, and moreover, special preference and novelty are claimed for its location at and around the exhaust end of the prime mover 10, as shown, whereby the expanded fluid will enter the condenser 25 readily from the prime mover 10 and will spread out from the center toward the periphery. The condenser 25 occupies the whole annular space between the prime mover 10 and the duct 12 so that the full volume of air from the impeller 7 must pass through its cellular body on the way to the generator 10a. The latent heat released from the fluid in the condenser 25 will preheat the air for the combustion in the generator 10a, whereby the thermal efficiency of the whole process of power generation will be materially increased.

While in the power plant in Fig. 1 but one medium is used for both combustion and power generation, in the power plant in Fig. 2 two separate media perform these functions, and it is desirable that they both be adjusted simultaneously for accurate control of power output and fuel economy. To this end a series of controllable shutters is disposed anywhere in the duct 12, preferably in its narrowest section at the intake port 11, as shown; the shutters 23 are pivoted at their ends and are revolvable by means of the lever 15 to admit either full volume of air into the generator 10a, or to shut it off completely.

For adjusting the volume of working fluid released from the generator 10a into the prime mover 10, a valve or throttle 21 is embodied in the fluid conduit 22, this throttle being operated by means of the lever 19. Now, in order to obtain synchronous action of the generator 10a and the prime mover 10, the control levers 15 and 19 of the shutters 23 and the throttle 21, respectively, are interconnected by means of the link 26; the lever 19 is operated directly through the instrumentality of the push-and-pull rod 20 which leads to the operator's seat. By means of this interconnection the generation of fluid in the generator 10a and its release in the prime mover 10 are effected simultaneously and in correct proportion to each other.

The power plant in Fig. 3 is another typical installation of my supercharging apparatus, the power plant 10 representing an internal combustion engine of either the Otto or the Diesel type, housed in the nacelle 1 and driving the propeller 18 in the tail end of the nacelle. The nacelle 1 is a self-contained body supported or suspended with the power plant 10 and its cooling and supercharging apparatus by means of the structure 6. The nacelle 1 has in its nose the opening 4 through which the shaft 17 protrudes outwardly and mounts the impeller 7. The shaft 17 is driven by the power plant 10 through the coupling 28, and is supported centrally and rotatably by the bracket 29 close to the opening 4.

The duct 12 extends from the ring 5 straight inwardly for a distance before it begins to contract in cross-sectional area, and finally connects to the intake port 11. In the straight portion of the duct 12 adjacent the spider 29 is disposed a series of shutters 23 for varying the volume of air admitted from the impeller 7, and behind the shutters 23 is disposed the heat exchanger 25 through which the air stream must pass at high velocity. By the term "heat exchanger" I designate either a condenser, or a water radiator, or a radiator for chemical cooling fluids, or an oil radiator, and in any case an air preheater. The control of the engine 10 is by means of the throttle 14, similarly as in Fig. 1.

I claim:

1. In combination, a power plant having an air intake, an air blower having an open base and being rotatably journalled to said power plant, said blower comprising a plurality of vanes bordering with an edge along the periphery thereof and from said periphery sloping inwardly in the angular direction and from said base thereof sloping in the axial direction for attacking, in rotation, air and forcing same toward said base and outwardly through it, and means connected to said air intake of said power plant for intercepting the air discharged by said blower.

2. In combination, a hollow body having an opening in one extremity thereof, a power plant in said body having an air intake and a driving shaft projecting through said opening therein, a spinner shell mounted on said shaft exteriorly of said body, said shell having an axially spaced open base and an apex and between said base and apex having a plurality of air scoops facing the angular direction of rotation thereof for attacking air and forcing same inwardly and axially through said base thereof into said body, and means in said body connected to said air intake therein for intercepting the air discharged by said spinner shell thereinto.

3. In combination, a power plant having an air intake and a driving shaft, an air blower mounted rotatably on said shaft, said blower having an open base and therefrom tapering to an axially distanced apex, and between said base and apex said blower having a plurality of peripheral air scoops facing the angular direction of rotation thereof for getting hold, in rotation, of air and forcing same inwardly to and outwardly through said base thereof, and an air duct, said duct registering with said open base of said blower and therefrom extending to said air intake of said power plant and conjoining thereto.

4. In combination, a power plant having an air intake and a driving shaft, an air blower mounted rotatably on said shaft, said blower having an open base and forwardly of said base comprising a plurality of two-edged vanes sloping from said base in the axial direction and sloping from the periphery of said blower inwardly in the angular direction for attacking, in rotation, air and forcing same to said base and outwardly therethrough, and an air duct, said duct registering at one end thereof with said base of said blower and at the other end conjoining to said air intake of said power plant.

5. In combination, a power plant having an air intake and a driving shaft, an air blower mounted rotatably on said shaft, said blower having an open end and a closed end axially spaced therefrom and between said ends thereof comprising a plurality of vanes having each one leading edge bordering along the periphery thereof and one trailing edge on a smaller radius than said leading edge whereby each two successive vanes will delineate an air scoop between the radially spaced opposite edges thereof for getting hold, in rotation, of air and forcing same inwardly to and outwardly through said base, and an air duct having a receiving end and a terminal end, said receiving end of said duct registering with said base of said blower and said terminal end conjoining to said air intake of said power plant.

6. In combination, a hollow body having an opening in one extremity thereof, a power plant having an air intake and a driving shaft in said body with said shaft thereof projecting through said opening therein, an air blower mounted on said shaft exteriorly of said body, said blower comprising an open base registering with said opening in said body and forwardly of said base including a plurality of peripheral vanes sloping from said base in the axial direction and having each one leading and one trailing edge and between said edges assuming an angle of incidence with respect to the angular direction of rotation thereof whereby said leading edge will be radially more distant than said trailing edge thereof and in rotation will force air inwardly from said leading edge toward said trailing edge and axially to and through said base of said blower, and means in said body connected to said air intake therein for intercepting the air coming from said blower.

7. In combination, a hollow body tapering to one extremity thereof and terminating with an opening thereat, a power plant in said body having an air intake and a driving shaft, said shaft projecting through said opening in said body, an air blower mounted on said shaft exteriorly of said body, said blower having an open base registering with said opening in said body and therefrom tapering in the axial direction to an apex thereby forming, in outline, a complement to said tapering body, and between said apex and said base said blower having a plurality of two-edged peripheral vanes angularly disposed to form as many air scoops between the opposite edges thereof for getting hold, in rotation, of air and forcing same inwardly and axially through said base of said blower, and an air duct in said body, said duct conjoining to said opening therein at one end and to said air intake of said power plant at the other end thereof for conveying the air from said blower to and into said air intake.

8. In combination, a power plant having an air intake, an air blower having an open base and being rotatably journalled to said power plant, said blower comprising a plurality of vanes sloping with an edge from said base thereof in the axial direction and from said edge sloping inwardly in the angular direction for attacking, in rotation, air and forcing same toward said base and outwardly therethrough, an air duct registering at one end with said base of said blower and at the other end conjoining to said air intake of said power plant, and means for sealing the clearance between said blower and said duct against loss of the air delivered by said blower into said duct.

9. In combination, a power plant having an air intake, an air blower having an open base and being rotatably journalled to said power plant, said blower comprising a plurality of vanes sloping with an edge from said base thereof in the axial direction and from said edge sloping inwardly in the angular direction for attacking, in rotation, air and forcing same toward said base and outwardly therethrough, a shrouding band at and around said base of said blower, and an air duct, said duct embracing said shrouding band at one end and conjoining to said air intake of said power plant at the other end thereof.

10. In combination, a power plant having an air intake, an air blower having an open base and being rotatably journalled to said power plant, said blower comprising a plurality of vanes sloping with an edge from said base thereof in the axial direction and from said edge sloping inwardly in the angular direction for attacking, in rotation, air and forcing same toward said base and outwardly therethrough, an air duct registering at one end with said base of said blower and at the other end conjoining to said air intake of said power plant, and controllable means in said duct for regulating the volume of air passing therethrough.

11. In combination, a hollow body having an opening in one extremity thereof, a power plant employing combustion mainly at constant volume in said body, said power plant having an intake port for air relatively smaller than said opening but of approximately equal area, an air blower mounted on a driven shaft at said opening and adapted to discharge, in rotation, air thereinto, and an air duct extending between said opening in said body and said intake port, said duct maintaining an approximately constant cross-sectional area between the extremities thereof whereby the velocity of the air from said blower will be preserved for utilization in said power plant.

12. In combination, a hollow body having an opening in one extremity thereof, a power plant in said body having an intake port for air, an air impeller mounted on a driven shaft at said opening and adapted to discharge, in rotation, air thereinto, an air duct for receiving said air and conveying same to said power plant, said duct extending between said opening in said body and said intake port of said power plant, and a heat exchanger for said power plant, said exchanger being disposed in said duct.

13. In combination, a hollow body having an opening in one extremity thereof, a power plant in said body having an intake port for air, an air impeller mounted on a driven shaft at said opening and adapted to discharge, in rotation, air thereinto, an air duct for receiving said air and conveying same to said power plant, said duct extending between said opening in said body and said intake port of said power plant, a heat exchanger for said power plant disposed in said duct, and a series of controllable shutters disposed in said duct for varying the volume of air passing therethrough.

14. In combination, a hollow body tapering to an opening in one extremity thereof, a power plant in said body having a relatively small intake port for air, means in said port for controlling the admission of air, an air impeller having a conoidal profile contour and comprising a number of vanes disposed substantially longitudinally between the apex and the base thereof, said impeller registering at said base thereof with said opening in said body and being journalled to said power plant therethrough, a band enshrouding said impeller at said base thereof with a tapering portion and protruding into said body with a substantially cylindrical portion, an air duct for receiving the air from said impeller and conveying same to said power plant, said duct connecting to said opening in said body and embracing said impeller shrouding band therein with a small clearance and therefrom proceeding to said intake port and finally making a juncture therewith, a series of controllable shutters disposed in said duct for varying the area of passage therethrough, and a heat exchanger for said power plant positioned in said duct.

15. In combination, a hollow body having an opening in one extremity thereof, a power plant in said body comprising an elastic fluid generator and a prime mover, said generator having an intake port for air, an air impeller mounted on a driven shaft at said opening and adapted to discharge, in rotation, air thereinto, and an air duct for receiving said air and conveying same to said power plant, said duct connecting to said body at said opening and therefrom extending inwardly to said generator and conjoining to said intake port thereof.

16. In combination, a hollow body having an opening in one extremity thereof, a power plant in said body comprising an elastic fluid generator and a prime mover, said generator having an intake port for air, said prime mover being positioned at said opening in said body and having a shaft projecting axially therethrough, an air impeller mounted on said shaft at said opening and adapted to discharge, in rotation, air thereinto, and an air duct for receiving said air and conveying same to said power plant, said duct extending between said opening in said body and said intake port of said generator, said duct enclosing said prime mover therein.

17. In combination, a hollow body having an opening in one extremity thereof, a power plant in said body comprising an elastic fluid generator and a prime mover, said generator having an intake port for air, an impeller mounted on a driven shaft at said opening and adapted to discharge, in rotation, air thereinto, an air duct for receiving said air and conveying same to said power plant, said duct extending between said opening in said body and said intake port of said generator, and controllable means for regulating the admission of air into said generator.

18. In combination, a hollow body having an opening in one extremity thereof, a power plant in said body comprising an elastic fluid generator and a prime mover, said generator having an intake port for air, an impeller mounted on a driven shaft at said opening and adapted to discharge, in rotation, air thereinto, an air duct for receiving said air and conveying same to said power plant, said duct extending between said opening in said body and said intake port of said generator, and a condenser for said power plant, said condenser being disposed in said duct.

19. In combination, a hollow body having an opening in one extremity thereof, a power plant in said body comprising an elastic fluid generator and a prime mover, said generator having an intake port for air, said prime mover being positioned at said opening and having a shaft projecting axially therethrough, an air impeller mounted on said shaft at said opening and adapted to discharge, in rotation, air thereinto, an air duct for receiving said air and conveying same to said power plant, said duct extending between said opening and said intake port of said generator, said duct enclosing said prime mover therein, and a condenser for said prime mover, said condenser being disposed at and around the exhaust end of said prime mover annularly within said duct.

20. In combination, a hollow body having an opening in one extremity thereof, a power plant in said body comprising an elastic fluid generator and a prime mover, said generator having an intake port for air, an air impeller mounted on a driven shaft at said opening and adapted to discharge, in rotation, air thereinto, an air duct for receiving said air and conveying same to said power plant, said duct extending between said opening in said body and said intake port of said generator, means for controlling the admission of air into said generator, and means for releasing elastic fluid from said generator into said prime mover, said air control and said fluid release means being interconnected for simultaneous opening and closing.

21. In combination, a hollow body having an opening in one extremity thereof, a power plant in said body comprising an elastic fluid generator and a prime mover, said generator having an intake port for air, an air impeller mounted on a driven shaft at said opening and adapted to discharge, in rotation, air thereinto, an air duct for receiving said air and conveying same to said power plant, said duct extending between said opening in said body and said intake port of said generator, a series of shutters in said duct for controlling the admission of air into said generator, a fluid conduit having a throttle therein extending between said generator and said prime mover, levers for operating said shutters and said throttle, means for controlling one of said levers remotely, and a link interconnecting said levers for synchronous action of said throttle and said shutters.

22. In combination, a hollow body tapering to an opening in one extremity thereof, a power plant in said body comprising an elastic fluid generator and a prime mover, said generator having an intake port for air, said prime mover being positioned at said opening and having a shaft projecting axially therethrough, an air impeller mounted on said shaft at said opening and adapted to discharge, in rotation, air thereinto, means for sealing the clearance between said body and said impeller, an air duct for receiving the air from said impeller and conveying same to said power plant, said duct extending between said opening in said body and said intake port of said generator, a condenser for said power plant disposed in said duct, means for controlling the admission of air into said generator, means for releasing fluid from said generator into said prime mover, and means for simultaneous control of said air admission means and said fluid release means.

23. In combination, a hollow body tapering to an opening in one extremity thereof, a power plant in said body comprising an elastic fluid generator and a prime mover, said generator having an intake port for air, said prime mover being positioned at said opening and having a shaft projecting axially therethrough, an air impeller comprising a number of vanes disposed substantially longitudinally between an apex and a base, said impeller being mounted on said shaft with said base thereof registering with said opening in said body, a band enshrouding said impeller at said base thereof with a tapering portion and protruding into said body with a substantially cylindrical portion, an air duct for receiving the air from said impeller and conveying same to said power plant, said duct connecting to said opening and closely embracing said impeller shrouding band therein and thence extending inwardly toward said intake port of said generator and making a juncture therewith, said duct enclosing said prime mover therein, a condenser for said power plant, said condenser being disposed at and around the exhaust end of said prime mover annularly in said duct, a series of shutters in said duct for controlling the admission of air into said generator, a fluid conduit having a throttle therein extending between said generator and said prime mover, and means for simultaneously opening and closing said shutters and said throttle.

24. In combination, a hollow body tapering to an opening in one extremity thereof, a power plant in said body having an intake port for air, a shaft coupled to said power plant and therefrom extending toward said opening in said body and axially therethrough, means in said body for supporting said shaft centrally and rotatably, an air impeller comprising a number of vanes disposed substantially longitudinally between an apex and a base, said impeller being mounted on said shaft with said base thereof registering with said opening in said body, means for sealing the clearance between said body and said impeller, an air duct for receiving the air from said impeller and conveying same to said power plant, said duct extending between said opening in said body and said intake port of said power plant, a series of controllable shutters in said duct for varying the area of passage therethrough, and a heat exchanger disposed in said duct.

25. In combination, a power plant having an air intake, an air blower having an open base and being rotatably journalled to said power plant, said blower comprising a plurality of vanes sloping from said base thereof in the axial direction and sloping from the periphery thereof inwardly in the angular direction for attacking, in rotation, air and forcing same toward said base and outwardly therethrough, an air duct registering at one end with said base of said blower and at the other end conjoining to said air intake of said power plant, and a heat exchanger receiving waste heat from said power plant, said exchanger being exposed to the air passing through said duct between said blower and said air intake.

26. In combination, a power plant having an air intake, an air blower having an open base and being rotatably journalled to said power plant, said blower comprising a plurality of vanes sloping from said base thereof in the axial direction and sloping from the periphery thereof inwardly in the angular direction for attacking, in rotation, air and forcing same toward said base and outwardly therethrough, an air duct registering at one end with said base of said blower and at the other end conjoining to said air intake of said power plant, a heat radiator receiving waste heat from said power plant, and a series of shutters adjacent thereto, said radiator and said shutters being disposed in said duct between said ends thereof.

27. In combination, an internal combustion engine having a relatively small intake for air, an air blower having an open base and being rotatably journalled to said engine, said blower comprising a plurality of vanes sloping from said base thereof in the axial direction and sloping from the periphery thereof inwardly in the angular direction for attacking, in rotation, air and forcing same toward said base and outwardly therethrough, and an air duct registering at one end with said base of said blower and at the other end with said air intake of said engine, and between said ends thereof said duct gradually effecting the reduction in size of said air intake relative to said blower for increasing the compression of the air passing therethrough.

28. In combination, a power plant comprising a prime mover and a fluid generator having an air intake, an air blower having an open base and being rotatably journalled to said prime mover, said blower comprising a plurality of vanes sloping from said base thereof in the axial direction and sloping from the periphery thereof inwardly in the angular direction for attacking, in rotation, air and forcing same toward said base and outwardly therethrough, and an air duct registering at one end with said base of said blower and at the other end conjoining to said air intake of said fluid generator.

29. In combination, a power plant comprising a prime mover and a fluid generator having an air intake, an air blower having an open base and being rotatably journalled to said prime mover, said blower comprising a plurality of vanes sloping from said base thereof in the axial direction and sloping from the periphery thereof inwardly in the angular direction for attacking, in rotation, air and forcing same toward said base and outwardly therethrough, an air duct registering with said base of said blower at one end and at the other end conjoining to said air intake of said fluid generator, and a heat exchanger receiving waste heat from said prime mover, said exchanger being exposed to the air passing through said duct.

30. In combination, a power plant comprising a prime mover and a fluid generator having an air intake, an air blower having an open base and being rotatably journalled to said prime mover, said blower comprising a plurality of vanes sloping from said base thereof in the axial direction and sloping from the periphery thereof inwardly in the angular direction for attacking, in rotation, air and forcing same toward said base and outwardly therethrough, an air duct registering with said base of said blower at one end and at the other end conjoining to said air intake of said fluid generator, a heat exchanger for said prime mover, and a series of shutters adjacent said exchanger, said prime mover, heat exchanger and shutters being disposed in said duct between said ends thereof.

31. In combination, a hollow body tapering to one extremity thereof and terminating with an opening thereat, a power plant in said body having an air intake and a driving shaft, said shaft projecting through said opening, a heat exchanger for said power plant, a spinner shell mounted on said shaft and forming in outline a complement of said body to an apex, said spinner shell having an open base registering with said opening in said body and between said base and said apex having a plurality of air scoops facing the angular direction of rotation thereof for attacking air and forcing same inwardly and axially through said base thereof into said body, an air duct in said body conjoining to said opening therein at one end and to said air intake of said power plant at the other end, said heat exchanger being disposed in said duct between said ends thereof, and a series of shutters in said duct for controlling the area of passage therethrough.

32. In combination, a hollow body tapering to one extremity thereof and terminating with an opening thereat, a power plant in said body comprising a prime mover and a fluid generator having an air intake, said prime mover having a driving shaft projecting through said opening in said body, a heat exchanger for said prime mover, a spinner shell mounted on said shaft and forming in outline a complement of said body to an apex, said spinner shell having an open base registering with said opening in said body and between said base and said apex having a plurality of air scoops facing the angular direction of rotation thereof for attacking air and forcing same inwardly and axially through said base thereof into said body, an air duct in said body conjoining to said opening therein at one end and to said air intake of said fluid generator at the other end, said heat exchanger and said prime mover being disposed in said duct between said ends thereof, and a series of shutters for controlling the area of passage through said duct located therein.

33. In combination, an air duct having an open end and a terminal end, a power plant comprising a fluid generator and a prime mover, said fluid generator being disposed exteriorly of said duct and having an air intake conjoining to said terminal end thereof, said prime mover being disposed in the interior of said duct and having a shaft extending to said open end thereof, and an air blower mounted on said shaft of said prime mover and adapted to accelerate air from said open end of said duct to said terminal end thereof.

34. In combination, an air duct having an open end and a terminal end, a power plant comprising a fluid generator, a prime mover and a heat exchanger, said fluid generator being disposed exteriorly of said duct and having an air intake conjoining to said terminal end thereof, said heat exchanger being disposed in said duct between said ends thereof, said prime mover having a shaft extending to said open end of said duct, and an air blower mounted on said shaft and adapted to accelerate, in rotation, air from said open end of said duct to said terminal end thereof.

35. In combination, an air duct having an open end and a terminal end, a power plant comprising a fluid generator, a prime mover, a heat exchanger, and a series of shutters adjacent said exchanger, said fluid generator being disposed exteriorly of said duct and having an air intake conjoining to said terminal end thereof, said prime mover, heat exchanger and shutters being disposed in the interior of said duct, and an air blower, said blower being disposed at said open end of said duct and being rotatably journalled to said prime mover therein and adapted to accelerate, in rotation, air from said open end to said terminal end of said duct.

JOHN PAVLECKA.